(12) United States Patent
Bae

(10) Patent No.: US 11,653,124 B2
(45) Date of Patent: May 16, 2023

(54) IMAGE SENSOR AND OPERATION METHOD OF IMAGE SENSOR

(71) Applicant: SK hynix Inc., Gyeonggi-do (KR)

(72) Inventor: Hyuen Hee Bae, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 114 days.

(21) Appl. No.: 17/393,265

(22) Filed: Aug. 3, 2021

(65) Prior Publication Data
US 2022/0247954 A1  Aug. 4, 2022

(30) Foreign Application Priority Data
Jan. 29, 2021  (KR) ........................ 10-2021-0013383

(51) Int. Cl.
*H04N 5/57*  (2006.01)
*H04N 25/75*  (2023.01)
*H04N 25/772*  (2023.01)

(52) U.S. Cl.
CPC ........... *H04N 25/75* (2023.01); *H04N 25/772* (2023.01)

(58) Field of Classification Search
None
See application file for complete search history.

(56) References Cited

U.S. PATENT DOCUMENTS

| 8,299,513 | B2 | 10/2012 | Dai |
| 9,998,696 | B2 | 6/2018 | Yang |
| 2015/0208008 | A1* | 7/2015 | Gendai ................ H04N 5/3698 250/208.1 |

* cited by examiner

*Primary Examiner* — Mark T Monk
(74) *Attorney, Agent, or Firm* — IP & T Group LLP

(57) ABSTRACT

An image sensor includes a pixel suitable for supplying a pixel signal corresponding to sensed light to an output node; a current source suitable for sinking a current from the output node and increasing the amount of sinking current in a first boosting section within a section in which the pixel signal is output from the pixel; and an analog-to-digital conversion circuit suitable for digitally converting a voltage of the output node.

10 Claims, 2 Drawing Sheets

IMAGE SENSOR AND OPERATION METHOD OF IMAGE SENSOR

CROSS-REFERENCE TO RELATED APPLICATIONS

The present application claims priority of Korean Patent Application No. 10-2021-0013383, filed on Jan. 29, 2021, which is incorporated herein by reference in its entirety.

BACKGROUND

1. Field

Various embodiments of the present invention relate to an image sensor.

2. Description of the Related Art

In a CMOS image sensor (CIS), speed and power are in a trade-off relationship. Therefore, the CMOS image sensors mainly uses a column-parallel structure in which speed and power have an optimal trade-off form. This makes it difficult to integrate an analog-to-digital converter (ADC) into a narrow pixel width. For this reason, a simple type of a single-slope ADC is mainly used.

As image sensors make progress, the number of pixels of an image sensor is increasing, and the accuracy of analog-to-digital conversion is gradually increasing. Accordingly, the time required for analog-to-digital conversion increases.

SUMMARY

Embodiments of the present invention are directed to an image sensor with a shortened time for analog-to-digital conversion.

In accordance with an embodiment of the present invention, an image sensor includes: a pixel suitable for supplying a pixel signal corresponding to sensed light to an output node; a current source suitable for sinking a current from the output node and increasing the amount of sinking current in a first boosting section within a section in which the pixel signal is output from the pixel; and an analog-to-digital conversion circuit suitable for digitally converting a voltage of the output node.

In accordance with another embodiment of the present invention, a method for operating an image sensor includes: supplying a pixel signal corresponding to sensed light to an output node; sinking a first current from the output node; sinking a second current from the output node, wherein a current amount of the second current less than a current amount of the first current; and analog-to-digital converting a pixel voltage generated based on a balance between a current corresponding to the pixel signal and the second current.

In accordance with still another embodiment of the present invention, an image sensor includes: a pixel suitable for outputting, to an output node, a reset signal in a first section and a pixel signal corresponding to sensed light in a second section following the first section; an analog-to-digital conversion circuit coupled to the output node and suitable for comparing the pixel signal with a ramp signal and generating a digital signal based on the comparing result; and a current source coupled to the output node and suitable for sinking a current from the output node, wherein each of the first section and the second section includes an initial section and a remaining section following the initial section, wherein the ramp signal is applied to the analog-to-digital conversion circuit in the remaining section of the first section and the initial section of the second section, and wherein the current source is controlled to sink a first current from the output node in the initial sections and sink a second current from the output node in the remaining sections, the first current being boosted from the second current.

DETAILED DESCRIPTION

Figure 1:
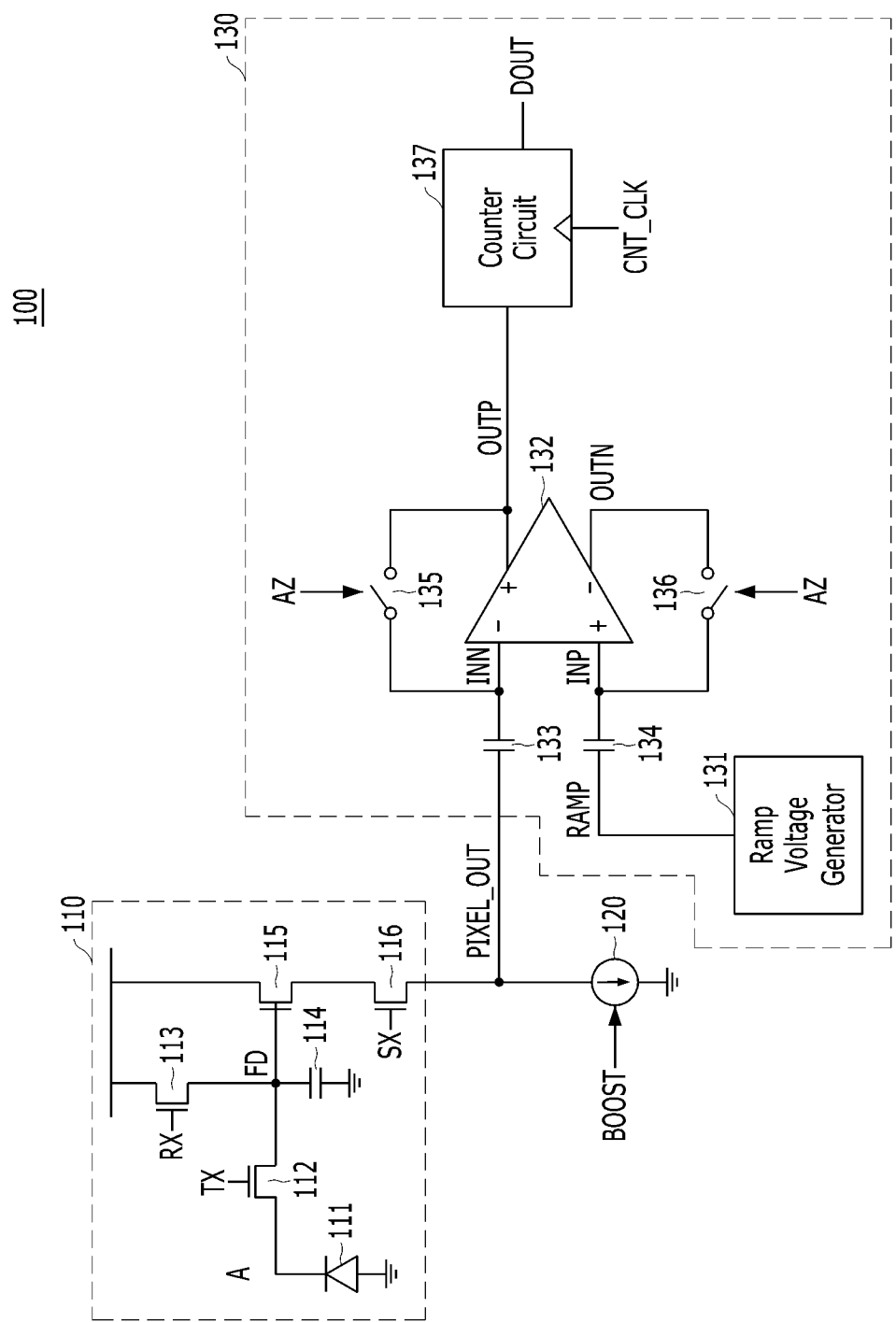
FIG. 1 is a diagram illustrating an image sensor in accordance with an embodiment of the present invention.

Various embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The drawings are not necessarily to scale and in some instances, proportions may have been exaggerated to clearly illustrate features of the embodiments. When a first layer is referred to as being "on" a second layer or "on" a substrate, it not only refers to a case where the first layer is formed directly on the second layer or the substrate but also a case where a third layer exists between the first layer and the second layer or the substrate.

FIG. 1 is a diagram illustrating an image sensor 100 in accordance with an embodiment of the present invention.

Referring to FIG. 1, the image sensor 100 may include a pixel 110, a current source 120, and an analog-to-digital conversion circuit 130.

The pixel 110 may sense light and output a signal corresponding thereto to an output node PIXEL_OUT. A plurality of pixels 110 may be provided in the form of an array including a plurality of rows and a plurality of columns. Here, only one pixel 110 may be illustrated to simplify the description of the present invention. The pixel 110 may include a photo detector 111, a transfer transistor 112, a reset transistor 113, a capacitor 114, a driving transistor 115, and a selection transistor 116.

The photo detector 111 may perform a photoelectric conversion function. The photo detector 111 may be realized using at least one among a photo diode, a photo transistor, a photo gate, a pinned photo diode, and a combination thereof. The transfer transistor 112 may electrically connect a node A to which the photo detector 111 is coupled to a floating diffusion node FD in response to a transfer signal TX. The floating diffusion node FD may be a node in which electric charges corresponding to light detected by the photo detector 111 or electric charges corresponding to an initialization voltage are accumulated. The capacitor 114 may be coupled to the floating diffusion node FD. The reset transistor 113 may initialize the voltage level of the floating diffusion node FD by supplying a power source voltage to the floating diffusion node FD in response to a reset signal RX. The driving transistor 115 may include a gate coupled to the floating diffusion node FD, and a drain and a source coupled between a power source voltage terminal and the selection transistor 116. The driving transistor 115 may amplify the voltage of the floating diffusion node FD. The higher the voltage level of the floating diffusion node FD is, the stronger the driving transistor 115 is turned on, so that more current may be transferred to the selection transistor 116. The selection transistor 116 may transfer the current transferred from the driving transistor 115 to an output node PIXEL_OUT in response to the selection signal SX.

The current source 120 may sink the current from the output node PIXEL_OUT of the pixel 110. The current source 120 may basically sink a certain amount of current from the output node PIXEL_OUT. However, when a boosting signal BOOST is activated, the current source 120 may sink more current from the output node PIXEL_OUT. When the boosting signal BOOST is deactivated, the current source 120 may sink a relatively small amount of current from the output node PIXEL_OUT. Further, when the boosting signal BOOST is activated, the current source 120 may sink a relatively large amount of current from the output node PIXEL_OUT. The voltage level of the output node PIXEL_OUT may be determined based on the amount of current sourced from the selection transistor 116 and the amount of current sinked by the current source 120. Thus, it may take a considerable time before the voltage level of the output node PIXEL_OUT is stabilized. Boosting of the current source 120 may be used to reduce this settling time. The steady state voltage level of the output node PIXEL_OUT may be determined based on the amount of current of the current source 120 and the amount of current of the selection transistor 116 when the boosting signal BOOST is deactivated. To reduce the time taken to reach the steady state, boosting to temporarily increase the amount of current of the current source 120 may be used.

The analog-to-digital conversion circuit 130 may convert the voltage of the pixel output node PIXEL_OUT into a digital code DOUT. The analog-to-digital conversion circuit 130 may include a ramp voltage generator 131, an operational amplifier 132, capacitors 133 and 134, switches 135 and 136, and a counter circuit 137.

The ramp voltage generator 131 may generate a ramp voltage RAMP. The ramp voltage RAMP may be a voltage for a ramping operation in which the voltage gradually decreases during an analog-to-digital conversion operation. The ramp voltage RAMP may be used for voltage level comparison with the voltage of the pixel output node PIXEL_OUT.

The operational amplifier 132 may receive the voltage of the pixel output node PIXEL_OUT through the capacitor 133 at an input terminal INN, and receive the ramp voltage RAMP through the capacitor 134 at the input terminal INP. The operational amplifier 132 may generate an output signal OUTP at a high level when the voltage level of the input terminal INP among the input terminals INN and INP is high. Further, the operational amplifier 132 may generate the output signal OUTP at a low level when the voltage level of the input terminal INN among the input terminals INN and INP is high. When the switches 135 and 136 are turned on, the input terminal INN and the output terminal OUTP of the operational amplifier 132 may be short-circuited, and the input terminal INP and the output terminal OUTN of the operational amplifier 132 may be short-circuited. Thus, the operational amplifier 132 may be auto-zeroed. The input terminal INN may be a negative (−) input terminal (i.e., an inversion input terminal), and the input terminal INP may be a positive (+) input terminal (i.e., a non-inversion input terminal). The output terminal OUTP may be a positive (+) output terminal (i.e., a non-inversion output terminal), and the output terminal OUTN may be a negative (−) output terminal (i.e., an inversion output terminal).

The counter circuit 137 may generate a digital code DOUT by counting the counting clock CNT_CLK in response to a signal from the output terminal OUTP of the operational amplifier 132.

Figure 2:
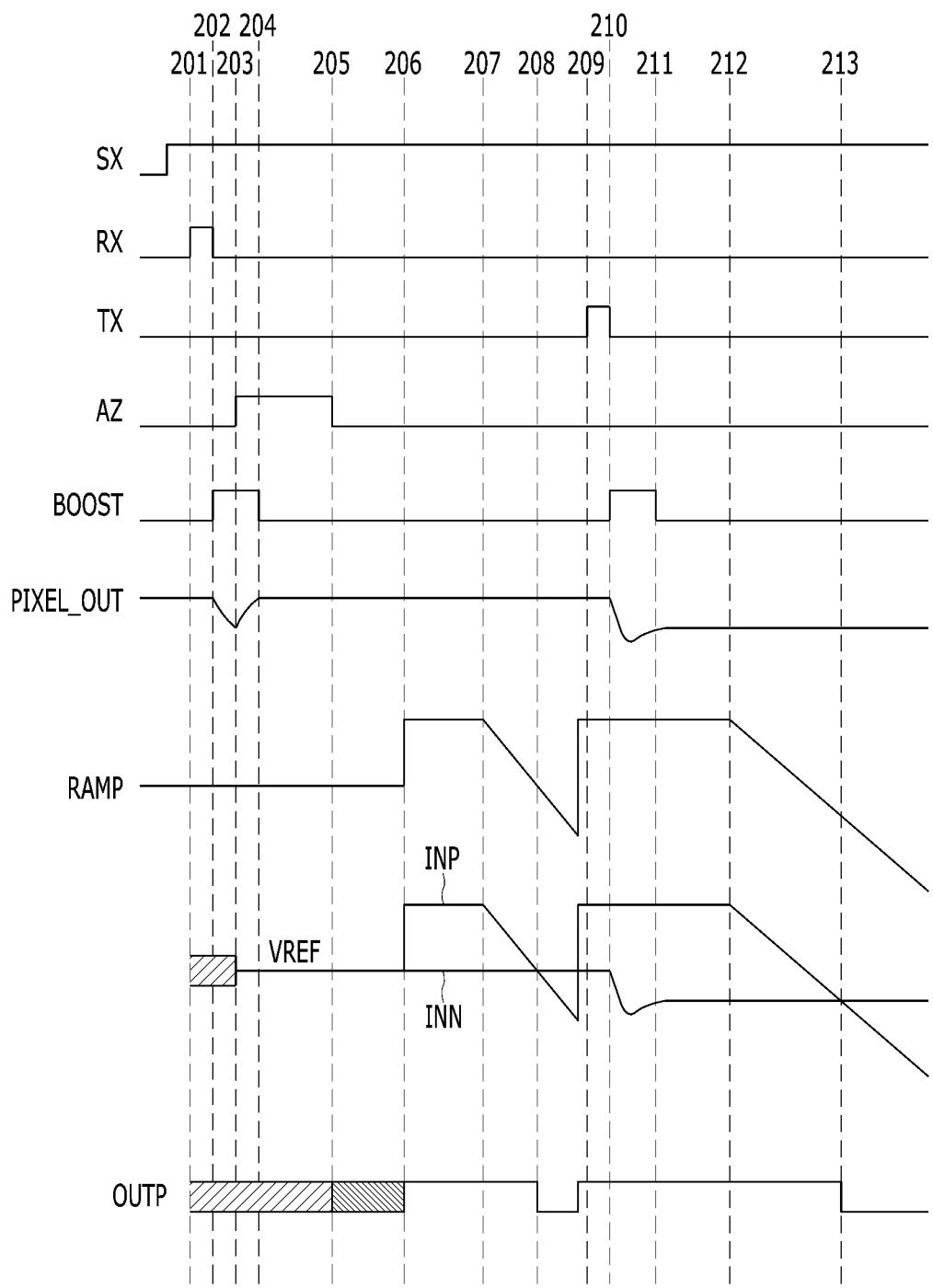
FIG. 2 is a timing diagram illustrating the operation of the image sensor shown in FIG. 1 in accordance with an embodiment of the present invention.

FIG. 2 is a timing diagram illustrating an operation of the image sensor 100 shown in FIG. 1 in accordance with an embodiment of the present invention.

Referring to FIG. 2, it may be seen that a signal is output from the pixel 110 of the image sensor 100 and a selection signal SX is maintained at a high level during a section where a signal output from the pixel 110 goes through analog-to-digital conversion.

At a moment '201', the reset signal RX may be activated to a high level, and the reset transistor 113 may be turned on to reset (initialize) the voltage level of the floating diffusion node FD. Then, a current corresponding to the reset voltage level of the floating diffusion node FD may be supplied from the pixel 110 to the output node PIXEL_OUT. The current corresponding to the reset voltage level of the floating diffusion node FD may be supplied to the output node PIXEL_OUT from the moment '201' to a moment '209', and this section may be called a reset output section.

The boosting signal BOOST may be activated from a moment '202' to a moment '204', and thus the amount of sinking current of the current source 120 may increase. Since the amount of sinking current of the current source 120 increases, the voltage level of the output node PIXEL_OUT may be momentarily lowered, and the boosting signal BOOST may be deactivated and stabilized at the same time. The voltage level of the output node PIXEL_OUT stabilized after the moment '204' may be determined based on the balance between the amount of current supplied by the pixel 110 to the output node PIXEL_OUT and the amount of current that the current source 120 sinks from the output node PIXEL_OUT. Since the amount of current of the current source 120 is a constant and the amount of current supplied by the pixel 110 to the output node PIXEL_OUT is determined based on the reset voltage level of the floating diffusion node FD, the voltage level of the output node PIXEL_OUT may be determined based on the reset voltage level of the floating diffusion node FD. The voltage of the output node PIXEL_OUT at this time may be called a reset signal.

A signal AZ may be activated from a moment '203' to a moment '205' to turn on the switches 135 and 136 so that the operational amplifier 132 may be auto-zeroed. The voltage levels of the two input terminals INN and INP of the operational amplifier 132 may become the same as a result of the auto zeroing operation. In the drawing, this voltage level may be indicated by VREF.

A ramping operation in which the level of the ramp voltage RAMP increases at a moment '206' and the level of the ramp voltage RAMP gradually decreases at a moment '207' may start. Just as the ramp voltage RAMP rises and falls, the voltage level of the input terminal INP may fluctuate as well. Since the voltage level of the input terminal INP is greater than the voltage level of the input terminal INN, the signal of the output terminal OUTP of the operational amplifier 132 may be at a high level.

From the moment '207' when the ramp voltage RAMP starts to fall to a moment '208' when the voltage level of the input terminal INP becomes equal to the voltage level of the input terminal INN, that is, to a moment when a signal of the output terminal OUTP transitions from high to low, the counter circuit 137 may generate a digital code DOUT by counting the number of times that a counting clock CNT_CLK is activated. Herein, the generated digital code DOUT may be a digital code corresponding to the reset signal RX.

At a moment '209', a transfer signal TX may be activated to a high level, and the transfer transistor 112 may be turned on, so that the charge of the photo detector 111 may be transferred to the floating diffusion node FD. Accordingly, from the moment '209', the current corresponding to the light sensed by the photo sensor 111 may be supplied to the output node PIXEL_OUT of the pixel 110.

As the boosting signal BOOST is activated from a moment '210' to a moment '211', the amount of sinking current of the current source 120 may increase. Since the amount of sinking current of the current source 120 increases, the voltage level of the output node PIXEL_OUT may be momentarily lowered, and the boosting signal BOOST may be deactivated and stabilized at the same time. The voltage level of the output node PIXEL_OUT stabilized after the moment '211' may be determined based on the voltage level of the floating diffusion node FD in which the charge of the photo detector 111 is stored. The voltage level of the output node PIXEL_OUT at this time may be referred to as a pixel signal. The voltage of the input terminal INN of the operational amplifier 132 may move in the same form as the output node PIXEL_OUT.

From a moment '212', a ramping operation in which the ramp voltage RAMP falls may start. Just as the ramp voltage RAMP falls, the voltage level of the input terminal INP may fluctuate as well. From the moment '212' when the ramp voltage RAMP starts to fall to a moment '213' when the voltage level of the input terminal INP becomes the same as the voltage level of the input terminal INN, that is, to a moment when the signal from the output terminal OUTP transitions from high to low, the counter circuit 137 may generate a digital code DOUT by counting the number of times that the counting clock CNT_CLK is activated. Herein, the generated digital code DOUT may be a digital code corresponding to a pixel signal.

When the value of the digital code corresponding to the reset signal (that is, noise) generated by the counter circuit 137 is subtracted from the value of the digital code corresponding to the pixel signal generated by the counter circuit 137, only information corresponding to the amount of light detected by the photo detector 111 may be obtained.

Referring to FIG. 2, it may be seen that the amount of sinking current of the current source 120 increases as the boosting signal BOOST is activated during an initial section in which the reset signal RX is output from the pixel 110 or the pixel signal is output. Through this operation, the voltage level of the output node PIXEL_OUT of the pixel 110 may reach a steady state more quickly. The settling time of the voltage level of the output node PIXEL_OUT may be reduced. This settling time may occupy a significant part of the analog-to-digital conversion operation. When the settling time is reduced, the time taken for the analog-to-digital conversion operation may also be reduced.

According to an embodiment of the present invention, it is possible to reduce the time taken for an analog-to-digital conversion operation of an image sensor.

While the present invention has been described with respect to the specific embodiments, it will be apparent to those skilled in the art that various changes and modifications may be made without departing from the spirit and scope of the invention as defined in the following claims.

What is claimed is:

1. An image sensor comprising:
   a pixel suitable for supplying a pixel signal corresponding to sensed light to an output node;
   a current source suitable for sinking a current from the output node and increasing the amount of sinking current in a first boosting section within a section in which the pixel signal is output from the pixel; and
   an analog-to-digital conversion circuit suitable for digitally converting a voltage of the output node.

2. The image sensor of claim 1, wherein the first boosting section is an initial section in which the pixel signal starts to be output from the pixel.

3. The image sensor of claim 1, wherein in a reset output section, the pixel outputs a reset signal to the output node, and
   the current source increases the amount of sinking current in a second boosting section within the reset output section.

4. The image sensor of claim 3, wherein the second boosting section is an initial section in which the reset signal starts to be output.

5. The image sensor of claim 1, wherein in a section in which the pixel signal is output excluding the first boosting section,
   the current amount of the current source is maintained at a constant level.

6. The image sensor of claim 3, wherein in the reset output section excluding the second boosting section,
   the current amount of the current source is maintained at a constant level.

7. The image sensor of claim 1, wherein the pixel includes:
   a photo detector coupled to a first node;
   a transfer transistor suitable for electrically connecting the first node to a floating diffusion node in response to a transfer signal;
   a reset transistor suitable for resetting the floating diffusion node in response to a reset signal;
   a capacitor coupled to the floating diffusion node;
   a driving transistor suitable for supplying a current in response to a voltage of the floating diffusion node; and
   a selection transistor suitable for transferring the current supplied by the driving transistor to the output node in response to a selection signal.

8. A method for operating an image sensor, the method comprising:
   supplying a pixel signal corresponding to sensed light to an output node;
   sinking a first current from the output node;
   sinking a second current from the output node, wherein a current amount of the second current less than a current amount of the first current; and
   analog-to-digital converting a pixel voltage generated based on a balance between a current corresponding to the pixel signal and the second current.

9. The method of claim 8, further comprising:
   supplying a reset signal to the output node;
   sinking a third current from the output node;
   sinking a fourth current from the output node, the fourth current less than the third current; and
   analog-to-digital converting a pixel voltage generated based on a balance between a current corresponding to the reset signal and the second current.

10. An image sensor comprising:
a pixel suitable for outputting, to an output node, a reset signal in a first section and a pixel signal corresponding to sensed light in a second section following the first section;
an analog-to-digital conversion circuit coupled to the output node and suitable for comparing the pixel signal with a ramp signal and generating a digital signal based on the comparing result; and
a current source coupled to the output node and suitable for sinking a current from the output node,
wherein each of the first section and the second section includes an initial section and a remaining section following the initial section,
wherein the ramp signal is applied to the analog-to-digital conversion circuit in the remaining section of the first section and the initial section of the second section, and
wherein the current source is controlled to sink a first current from the output node in the initial sections and sink a second current from the output node in the remaining sections, the first current being boosted from the second current.

\* \* \* \* \*